(No Model.)  P. G. EMERY.  2 Sheets—Sheet 1.
BRAKE HANDLE.

No. 576,043. Patented Jan. 26, 1897.

Witnesses;  Inventor;

(No Model.) 2 Sheets—Sheet 2.

P. G. EMERY.
BRAKE HANDLE.

No. 576,043. Patented Jan. 26, 1897.

Witnesses:
Sidney P. Hollingsworth
Arthur Garner

Inventor:
Plato G. Emery,
by G. H. W. T. Howard
atty.

THE NORRIS PETERS CO., PHOTO-LITHO., WASHINGTON, D. C.

UNITED STATES PATENT OFFICE.

PLATO G. EMERY, OF CHICAGO, ILLINOIS, ASSIGNOR TO THE ADAMS & WESTLAKE COMPANY, OF ILLINOIS.

BRAKE-HANDLE.

SPECIFICATION forming part of Letters Patent No. 576,043, dated January 26, 1897.

Application filed December 3, 1896. Serial No. 614,350. (No model.)

*To all whom it may concern:*

Be it known that I, PLATO G. EMERY, of the city of Chicago, in the county of Cook and State of Illinois, have invented certain new and useful Improvements in Brake-Handles, of which the following is a specification, reference being had to the accompanying drawings, and to the letters of reference marked thereon.

This invention relates to a brake-handle for employment on street or other cars, which when rotated in one direction by the driver or brakeman is operative upon the brake staff or rod, or some part rigidly secured thereto, to give corresponding rotation to the brake-staff and thus cause the brake to be set, but which will revolve loosely in an opposite direction or around upon the brake-staff without effecting movement of the latter.

In my Patent No. 558,371, dated April 14, 1896, is described a brake-handle of the class to which my present invention is applicable, and the objects of the present invention are to reduce friction between the working parts of such a brake-handle and thus to give greater ease of action, lessen the labor of the driver or brakeman, and obtain other advantages incident to the decrease of friction between the working parts of a mechanism, as reduction of wear, &c.

Figure 1:
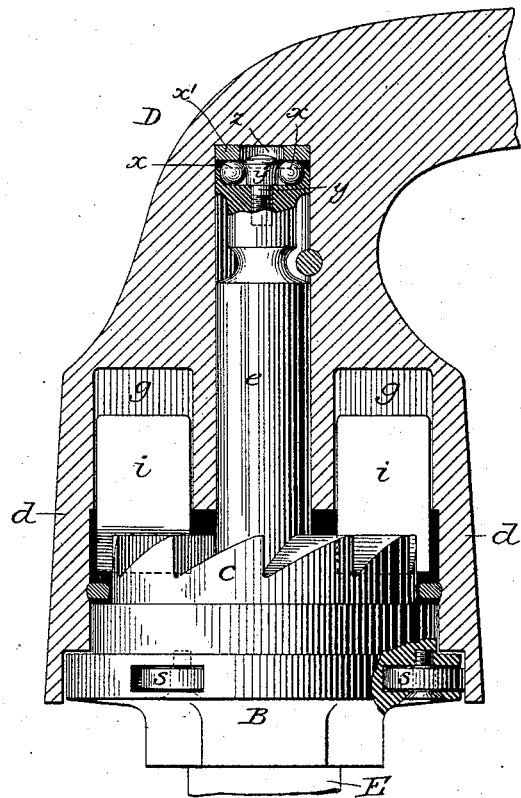
Figure 2:
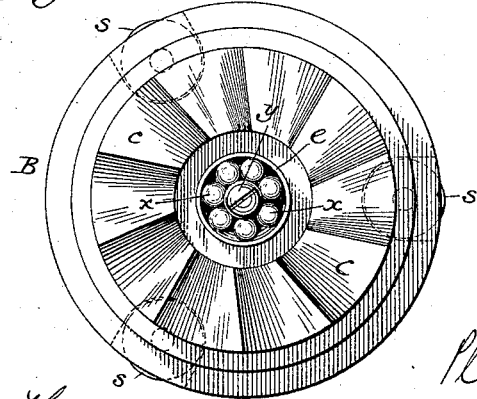
Figure 4:
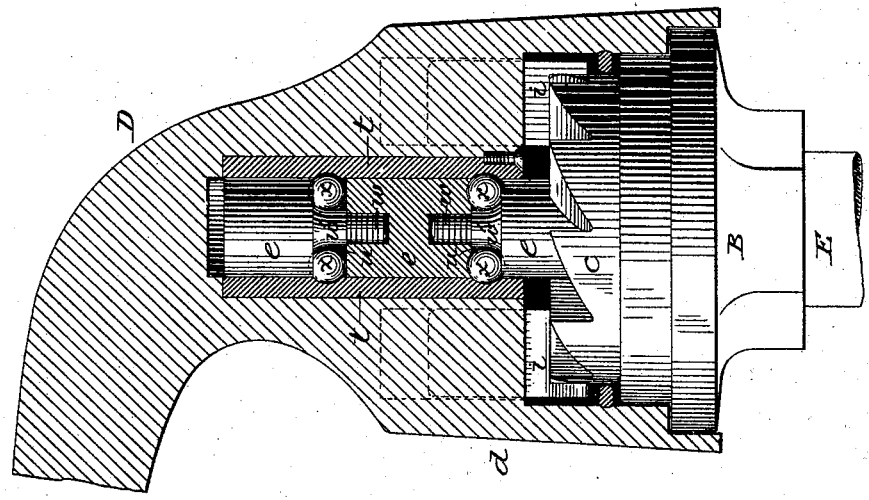
Figure 3:
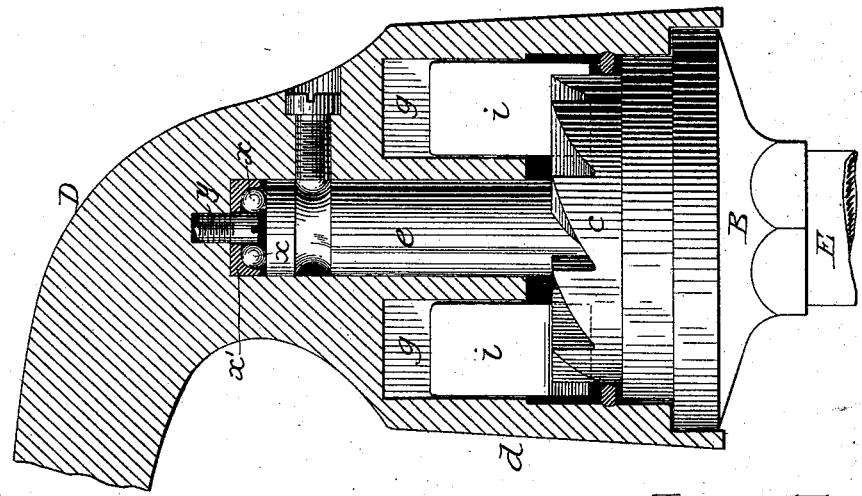

In the accompanying drawings, Figure 1 is a view, mainly in vertical section, of my invention. Fig. 2 is a top view of a part of the device, as hereinafter described. Fig. 3 is a view, chiefly in vertical section, of a modified form of my invention. Fig. 4 is a similar view of a further modification.

Similar letters of reference indicate similar parts in the respective figures.

E represents the brake staff or rod upon which the chain for operating the brake is usually wound.

B is a hub which, when in place, is rigidly attached to or forms a part of the brake staff or rod E. The hub B is provided with a ratchet $c$ and a portion $e$ of reduced diameter, which projects above or beyond the ratchet $c$.

The handle portion may be represented by D, and which, so far as its general appearance is concerned, is of an approved form now in use. The inner or pivotal portion of said part D is formed into a socket or enlarged hollow boss $d$. Within the socket or enlarged boss $d$ is formed, as shown, and substantially as in my said Patent No. 558,371, a series of pockets $g$, radiating from the center. The pockets $g$ may be formed within the socket or boss-casting itself, or, if preferred, a separate casting, comprising the pockets, may be secured within the boss $d$. Within each pocket $g$ is inserted, so as to have vertical movement therein, a pawl $i$, arranged and having the movement and function as described in my said prior patent, which, as will be seen, is followed in several other particulars, which therefore do not require a detailed description herein, and for a full understanding of which reference is made to my said former patent.

In order to reduce friction, I have applied hardened-steel balls $x$, as shown in the drawings. In Fig. 1 the upper end of the portion $e$ is made cup-shaped, and a series of such balls, here seven in number, (see Fig. 2,) are placed therein, extending above the top edge of the cup. The balls $x$ are held in place—that is to say, they are kept from moving toward the center of the cup—by means of a screw $y$, the threaded end of which is screwed into the portion $e$, the outer end $y'$ of the screw being curved so as to extend over the series of balls and prevent their being lifted from the cup or separated from it when the handle portion D and the hub B and its part E are detached. The outer part of the head $y$ of the screw is rounded and is received by the recess $z$, formed in the handle portion D, while in said handle portion is inserted a steel ring $x'$, against which the series of balls $x$ bear. The result of this construction is to lessen the friction between the handle and hub portions of the device.

In Fig. 3 a modified construction is shown. Here the upper or outer end of the portion $e$ is flat, and the balls $x$, resting thereon, are surmounted by the inverted steel cup or ring $x'$, the balls being separated and maintained in contact with the concave inner surface of said cup or ring by means of the screw $y$. In this case the screw at its outer end is cylindrical.

In Fig. 4 the portion $e$ is formed in sections united by screw-pins $w$, one of such screw-pins being formed upon the upper and one upon the lower section, the threaded portions of the pins entering the respective ends of the central section, spaces $u$ being provided, as indicated. The steel balls $x$ are confined in these spaces, being kept apart by the plain portions or shanks $w'$ of the screw-pins $w$. The ends of the sections of which the portion $e$ is formed, where they are in contact with the balls $x$, may be made concave or channeled, as shown at $x''$, in connection with the upper series of balls, they being thus well seated, although this does not form an essential feature of my invention. The portion $e$ is surrounded by a steel bushing or bearing $t$, which is interiorly grooved or circularly channeled to receive the outer circumferential portions of the balls $x$, as is clearly shown. It will be seen that by reason of the formation of the portion $e$ in sections and the uniting of them in the manner shown the balls may be readily inserted and the parts detached when required.

In Fig. 1 I have shown journaled upon a vertical axis in the base of the hub portion B a friction-roller $s$. A series of such rollers may, if preferred, be thus applied to assist in lessening the friction.

It will be understood from the above description that the brake staff and hub together form pivotal supports for the brake-handle, between which part or parts and the brake-handle the friction-reducing devices are introduced in either form of my invention, the object in view, namely, the reduction of friction between the operative parts, is attained. I do not restrict myself to the exact details here described, as it is obvious that certain minor and unimportant changes may be made in their construction and arrangement without a departure from the main feature of this invention. Such minor and unimportant changes may suggest themselves to skilled mechanics without the exercise of the inventive faculty, and therefore I consider such to be within the scope of my invention.

Having described my invention, I claim—

1. As an improvement in a brake-handle, a handle portion, a hub portion and a mechanism adapting the brake-handle, when rotated in one direction, to be operative upon the brake staff or rod, but to revolve loosely in the opposite direction, or around upon the brake-staff, without effecting movement of the latter, combined with friction-reducing devices interposed between the brake-handle and its pivotal supports, substantially as set forth.

2. As an improvement in a brake-handle, a handle portion, a hub portion and a mechanism adapting the brake-handle, when rotated in one direction, to be operative upon the brake staff or rod, but to revolve loosely in the opposite direction, or around upon the brake-staff, without effecting movement of the latter, combined with a ring or bearing rigidly attached to the brake-handle, and friction-reducing devices interposed between said ring or bearing and the brake-staff, substantially as set forth.

In testimony whereof I have hereunto set my hand and affixed my seal this 16th day of November, 1896.

PLATO G. EMERY. [L. S.]

Witnesses:
W. S. ESTELL,
C. T. CHURCH.